UNITED STATES PATENT OFFICE.

WILLIAM MANNING, OF BOSTON, MASSACHUSETTS, ASSIGNOR, BY MESNE AND DIRECT ASSIGNMENTS, TO THE HIGHLAND SLATE MANUFACTURING COMPANY, OF PORTLAND, MAINE.

PROCESS OF TREATING GYPSUM.

SPECIFICATION forming part of Letters Patent No. 395,159, dated December 25, 1888.

Application filed March 30, 1888. Serial No. 269,002. (No specimens.)

*To all whom it may concern:*

Be it known that I, WILLIAM MANNING, of Boston, in the county of Suffolk, State of Massachusetts, have invented a certain new and useful Improvement in the Process of Treating Gypsum, of which the following is a specification.

This invention is an improvement on that described in Patent No. 326,047, issued to me September 8, 1885; and it consists in extending the process of treating gypsum therein described, by which the gypsum is first reduced by mechanical means to a fine powder; second, the fine powder is calcined; third, the fine powder after calcining is put in a tank of water, which is kept in a state of agitation until the gypsum loses its tendency to reform itself, (or "set," as it is usually expressed;) fourth, the impurities heavier than the gypsum are allowed to settle to the bottom; fifth, the floating gypsum is separated from the water by straining or other suitable means; sixth, the gypsum is then dried, and, seventh, when thoroughly dried it is crushed and ground to an impalpable powder. This completes the process described and claimed in the patent referred to; but the product is not in that state of perfection desirable for use in the arts, and although very fine it still retains its acicular crystalline form, as an examination under the microscope shows, and is consequently transparent or translucent, carrying a large percentage of what is termed "water of crystallization," and has a marked tendency to absorb or take up water from the atmosphere. It is at this stage that my present invention comes in and totally changes the character of the treated gypsum, as it is left by the process described in the patent above referred to. This I accomplish by re-calcining the gypsum by a heat sufficient to completely break up and destroy all traces of crystalline formation and expel and drive off the, so-called, "water of crystallization." If necessary to eliminate impurities, it may be again treated with water, dried, crushed, and ground, when it will be found to be a truly impalpable powder, anhydrous and opaque, and perfectly fit for any use in the arts where such a substance is useful or desirable, as in the manufacture of rubber goods, paper, &c.

What I claim as new and my invention is—

In the treatment of gypsum for the production of an impalpable opaque anhydrous powder, a second calcination and subsequent reduction by crushing and grinding, as above described.

WILLIAM MANNING.

Witnesses:
O. M. SHAW,
E. M. SPINNEY.